United States Patent [19]

Crosby

[11] Patent Number: 5,398,182
[45] Date of Patent: Mar. 14, 1995

[54] POWER SUPPLY

[75] Inventor: Robert J. Crosby, Wickliffe, Ohio

[73] Assignee: Namco Controls Corporation, Mentor, Ohio

[21] Appl. No.: 94,552

[22] Filed: Jul. 20, 1993

[51] Int. Cl.⁶ .......................................... H02M 7/217
[52] U.S. Cl. ................................. 363/89; 363/68; 363/69; 307/71
[58] Field of Search .................. 363/67, 68, 89, 69, 363/78, 70, 45; 307/71

[56] References Cited

U.S. PATENT DOCUMENTS

| Re. 23,314 | 12/1950 | Nims . | |
|---|---|---|---|
| 2,980,842 | 4/1961 | Medlar . | |
| 3,694,731 | 9/1972 | Cherry | 321/27 R |
| 3,846,695 | 11/1974 | Genuit et al. | 321/27 R |
| 3,938,031 | 2/1976 | Blackmond | 323/23 |
| 3,984,750 | 10/1976 | Pfeffer et al. | 321/16 |
| 4,009,431 | 2/1977 | Johnson | 322/7 |
| 4,239,978 | 12/1980 | Kofink | 307/16 |
| 4,315,162 | 2/1982 | Ferguson | 307/66 |
| 4,339,704 | 7/1982 | McSparran et al. | 322/90 |
| 4,622,629 | 11/1986 | Glennon | 363/70 |
| 4,739,466 | 4/1988 | Glennon et al. | 363/89 |
| 4,788,452 | 11/1988 | Stanley | 307/71 |
| 4,937,731 | 6/1990 | Konopka | 363/143 |
| 5,001,623 | 3/1991 | Magid | 363/143 |
| 5,121,046 | 6/1992 | McCullough | 320/16 |

Primary Examiner—Steven L. Stephan
Assistant Examiner—Adolf Berhane
Attorney, Agent, or Firm—Watts, Hoffmann, Fisher & Heinke

[57] ABSTRACT

A power supply wherein the rectified output of two or more transformer secondaries are connected in series and then parallel each half cycle of an alternating current energization signal. Logic circuitry monitors the rectified output and automatically switches from a series to a parallel connection to provide a regulated power supply output.

19 Claims, 8 Drawing Sheets

POWER SUPPLY

FIELD OF THE INVENTION

The present invention concerns a power supply for providing a regulated direct current output from an alternating current energy source.

BACKGROUND ART

Low voltage, regulated direct current power supplies are commonly incorporated in many products. Personal computers, automobiles, and home appliances are examples of devices that require a regulated, direct current voltage derived from an alternating current energy source.

Home appliances that plug into a wall socket receive their energy from the electric utility providing a highly regulated 60 cycle (50 cycle in Europe) alternating current signal having a voltage that falls within a defined range. This alternating current signal must be stepped down in voltage and rectified to provide a DC signal within a range suitable for use by motors or circuits having specified power requirements. The step down in voltage is accomplished by a transformer that steps the relatively high voltage provided by the electric utility to a lower voltage alternating current signal. The output of a transformer secondary is rectified to produce a pulsed DC signal which is filtered to provide a DC output.

The DC output from filtering circuitry is often used in conjunction with integrated circuit voltage regulators to provide well regulated voltages for use in digital circuit energization. Relatively inexpensive off the shelf voltage regulators for this purpose are known in the prior art. Such voltage regulators are designed to work over a range of d.c. voltages at their inputs.

Power supplies are rated for the amount of power (typically specified in watts) they can provide at their output. If the circuit load placed on the power supply calls for more energy than this rating, the power supply may be unable to service the component. As an example, a DC motor drawing too high a current through the motor windings can exceed the power supply output. Since the power supply should accommodate changes in load and energization signals, one goal of a power supply is the provision of a desired output voltage over a range of input and output conditions.

It is known in the prior art to couple power supply transformer windings in either parallel or series to control outputs from a power supply. U.S. Pat. No. 3,984,750 to Pfeffer et al which issued Oct. 5, 1976 concerns a rectifier unit with phase windings which are switched from series to parallel configuration in response to an alternator frequency. By controllably switching the output from the phase windings, the manner in which battery charging occurs can be adjusted based upon engine speed. A preferred use of the circuit disclosed in Pfeffer et al is in charging a motor vehicle battery.

U.S. Pat. No. 4,339,704 to McSparran et al entitled "Series Parallel Transition For Power Supply" which issued Jul. 13, 1982 concerns a multi-winding, alternating current electric power supply. A load is coupled to the power supply by a power rectifier assembly having two legs coupled across the load. The legs are alternately coupled either in parallel or in series by a switch which controllably changes from the parallel to the series coupling. The switch between parallel and series coupling is controlled to maintain the torque output from a diesel powered locomotive motor.

U.S. Pat. No. 3,938,031 to Blackmond which issued Feb. 10, 1976 concerns an adjustable voltage power supply where the output from the supply is an alternating current signal. This signal is used to energize a resistance such as a heating element. The '031 patent includes a switching device that is controlled in a higher voltage range to produce a series winding connection at a predetermined point during each half cycle of a voltage output. The claim is made that the '031 apparatus operates with a lower maximum power output which can be maintained over a desired voltage range.

DISCLOSURE OF THE INVENTION

A power supply constructed in accordance with the present invention includes a transformer that is activated with an alternating current signal such as the regulated signal from a power utility. The signal could, however, also be the output from another A.C. source such as an automobile alternator.

The transformer induces a time varying signal in first and second secondaries. Although two secondaries are used in the disclosed preferred embodiment described below, more that two could also be used. Rectifiers provide pulsed first and second power supply signals from the two secondaries.

Logic circuitry interconnects the pulsed first and second power supply signals first in series and then in parallel during each successive cycle period of the alternating current input. A switch within the logic circuit responds to a sensed condition to switch back and forth from the series to parallel connection.

The resulting power supply provides a well maintained output over a range of input voltages and load currents and results in less energy loss due to heat dissipation in the power supply circuit. These and other objects advantages and features of the invention will be described below in conjunction with multiple alternate embodiments of the invention.

BEST MODE FOR PRACTICING THE INVENTION

Figure 1:
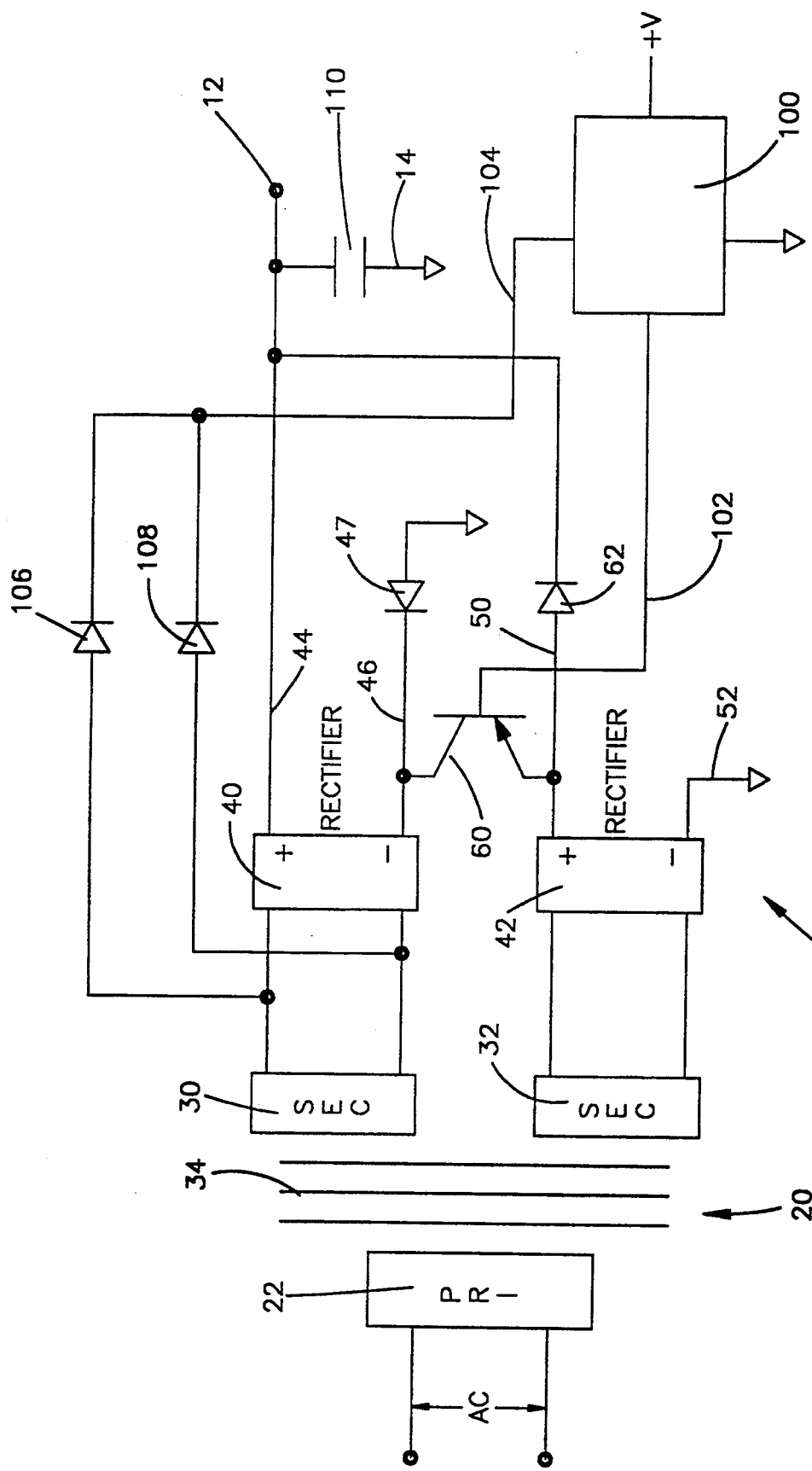
FIG. 1 is a schematic drawing of a first, preferred embodiment of a power supply constructed in accordance with the invention.

Turning now to the drawings, FIG. 1 depicts a power supply 10 for producing a regulated voltage output across two output terminals 12, 14. The output voltage across the two terminals 12, 14 can be adjusted depending on the application and in the embodiment of the invention depicted in FIG. 2 the voltage is adjusted to provide a 30 volt output voltage.

The power supply 10 includes a step down transformer 20 having a primary winding 22 that is energized by an alternating current source of energy (not shown). The alternating current signal applied across the transformer primary 22 causes alternating currents to flow through the primary winding 22 and set up electromagnetic fields that induce signals in two transformer secondaries 30, 32. This induced signal is enhanced due to the presence of a transformer core 34, constructed of a magnetically permeable material.

The relation between the voltage across the secondary and the voltage across the primary is dictated by the ratio of windings in the primary in relation to the secondary. For the power supply of FIG. 1 which provides a thirty volt output signal, the transformer would step down an input signal of 110–120 volts RMS to equal values across the secondaries of approximately 17 volts RMS.

As the voltage across the two secondaries 30, 32 switches back and forth, the signal is rectified by two rectifier circuits 40,42 (commercially available from General Instruments Inc.). A first rectifier circuit 40 has two outputs 44,46. The signal at the output 44 remains positive with respect to the output 46 and has a value equal to the induced voltage across the secondary 30. As the induced signal in the secondary 30 oscillates back and forth at the sixty cycle per second frequency of the input, for example, a pulsed signal having a signal frequency of 120 cycles per second is produced across the outputs 44, 46 of the rectifier circuit 40.

The second rectifier circuit 42 also has two outputs 50, 52 that provide a pulsing signal at twice the frequency of the 60 hertz alternating current energization signal which energizes the transformer primary 22.

The first and second rectifier circuits 40, 42 are coupled together by a switching transistor 60 which in a preferred embodiment of the invention is a PNP switching transistor. A positive output 50 from the second rectifier circuit 42 is connected to the negative output 46 from the first rectifier circuit 40 by the switch 60. If the switch 60 is closed (the transistor rendered conductive) signals output from the two rectifier circuits are connected in series and the voltage at the output 44 is the sum of the two voltages output from the rectifiers (minus the voltage drop across the transistor 60). If the switch 60 is open (the transistor is not conductive) the output 50 from the rectifier circuit 42 is connected in parallel with the output 44 through a diode 62.

The conductive state of the transistor 60 is controlled by a logic circuit 100 having a control output 102 coupled to a base input of the transistor 60. At the beginning of each half cycle, when the signal across the outputs of the circuits 40, 42 is small the transistor switch 60 is biased into conduction and the outputs from the rectifier circuits 40, 42 coupled in series.

The logic circuit includes a control input 104 coupled through two diodes 106, 108 to outputs from the transformer secondary 30. The input signal 104 is a rectified AC signal whose peak approximates the voltage on a capacitor 110 when the secondaries 30, 32 are series connected. During the alternating current energization period, one or the other of the two diodes 106, 108 is forward biased by an output signal from the secondary 30. The signal across the secondary (minus the 0.7 voltage drop across the diode) is coupled to the control input 104 to the logic circuit 100. By monitoring the magnitude of the secondary output, at an appropriate time during each half cycle of the energization period, when the series connected secondary voltage at the input 104 equals the desired capacitor output voltage, the output 102 goes high and the transistor 60 is turned off.

The signal at the output 44 is connected to a capacitor 110 which charges in response to the pulsed output signals from the two rectifier circuits 40, 42. Due to the constant voltage characteristic of a capacitor and the impedance of the transformer 20, the series connected voltage output from the transformer will flatten with a small slope as the capacitor is charged. The voltage on the capacitor 110 remains relatively stable, even though the rectifiers are producing pulsed outputs in response to the alternating current signals induced in the two secondaries 30, 32. Each time the capacitor 110 is charged to its intended value (30 volts), the secondaries are switched from series to parallel connection. This reduces available transformer secondary voltage and discontinues charging of the capacitor 110. Being inductors, the transformers' secondaries 30, 32 will each have the same currents just after as just prior to switching from series to parallel connection. Immediately after switching from series to parallel, stored energy in the transformers' magnetic/inductive circuit will raise each secondary voltage to the voltage on the capacitor 110 plus diode drops until this energy is transferred to the capacitor 110 through the diodes 47, 62. The capacitor 110 remains charged, keeping its voltage nearly constant. If the capacitor 110 is chosen with enough capacitance, determined by ripple voltage at full load current $V1/dt = I/C$, the voltage on capacitor 110 will remain constant minus the ripple voltage. Transferring the transformers' stored energy to the capacitor 110 after switching from series to parallel connection eliminates the requirement for a snubber or other transient protection of the switching transistor 60 and also makes the circuit more efficient.

Benefits include a voltage rating of the storage capacitor 110 that is slightly above the output voltage, i.e., 35 V capacitor for 30 V output. This provides a smaller physical size at a lower cost. Prior circuits require a 63 V capacitor for the same 30-volt output. Large amounts of capacitance are available in the smaller size providing excellent regulation. A smaller transformer is used since the transformer outputs less total power compared to traditional circuits due to improved circuit efficiency. A smaller physical size per watt output and less heat is generated over a wide range input voltage—i.e., 95–135 VAC compared to traditional circuits. Also, as seen below regarding alternate embodiments of the invention the design is compatible with integrated circuit technology.

Figure 2:
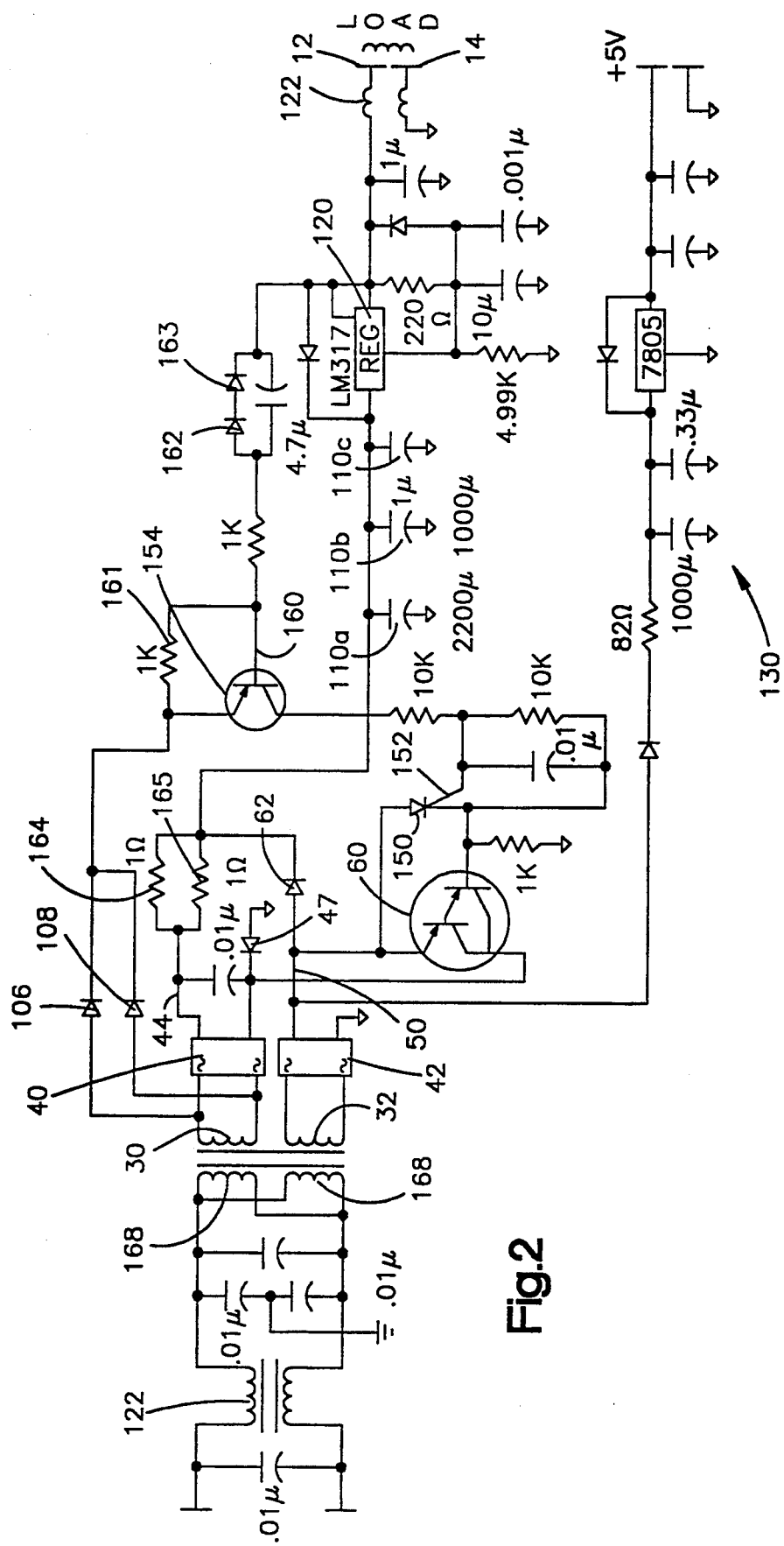
FIG. 2 is a detailed schematic of the FIG. 1 power supply.

Adding a series voltage regulator 120 to an output of the capacitor 110 provides for elimination of ripple voltage, better voltage regulation and short circuit protection. FIG. 2 discloses a detailed schematic of one embodiment of this enhanced version described broadly in conjunction with the FIG. 1 depiction. In FIG. 2, like reference characters are used to describe components previously described in relation to FIG. 1. The circuit includes a differential choke 122 for filtering noise at both its input terminals 124, 126 and at its output terminals 12, 14. The disclosed transformer 20 is a model LP34-1400 transformer from Signal, Inc.

FIG. 2 also has an alternate 5 volt power supply 130 coupled to an output from the full wave rectifier 42.

The FIG. 2 circuit includes three parallel capacitors 110a, 110b, 110c connected to a voltage regulator 120 having an output for producing a regulated signal at the terminals 12, 14. A silicon controlled rectifier (SCR) 150 has a gate input 152 connected to a switching transistor 154. When the switching transistor 154 conducts, it transmits a high signal to the gate input 152 of the silicon controlled rectifier 150. This causes the SCR to conduct and turns off the transistor 60 and switches the pulsed outputs from the rectifiers from a series to parallel coupling.

An emitter input to the switching transistor 154 is coupled to the two diodes 106, 108. A base 160 of switching transistor 154 is connected to the regulator output 12 (30 volts) through a 1K resistor and two leds 162, 163. When the output of diode 106 or 108 equals the regulator output+approximately 4.6 volts, the switching transistor 154 is rendered conductive, causing SCR 150 to receive a gate signal rendering the SCR conductive. Leds 162, 163 provide a voltage reference and optical indication of operation.

Since a capacitor is a constant voltage device, the voltage across a capacitor is relatively constant over a small period of time. Two parallel connected resistors 164, 165 equal to 0.5 ohm are series connected with the storage capacitors 110a, 110b, 110c creating a small delta voltage as current charges into the storage capacitors. This small delta voltage is added to the storage capacitor voltage to improve switching transistor 154's detection of the charging threshold point to switch on the SCR 150. This resistor also provides feedback to balance stored energy in the transformers' inductive component which will add a finite charge to the storage capacitor after the circuit switches from series to parallel. Any stored magnetic energy remaining in the transformers' secondary magnetic circuit when the secondaries are switched from series to parallel, is transferred to the storage capacitors 110a, 110b, 110c through diodes 62, 47.

Figure 6:
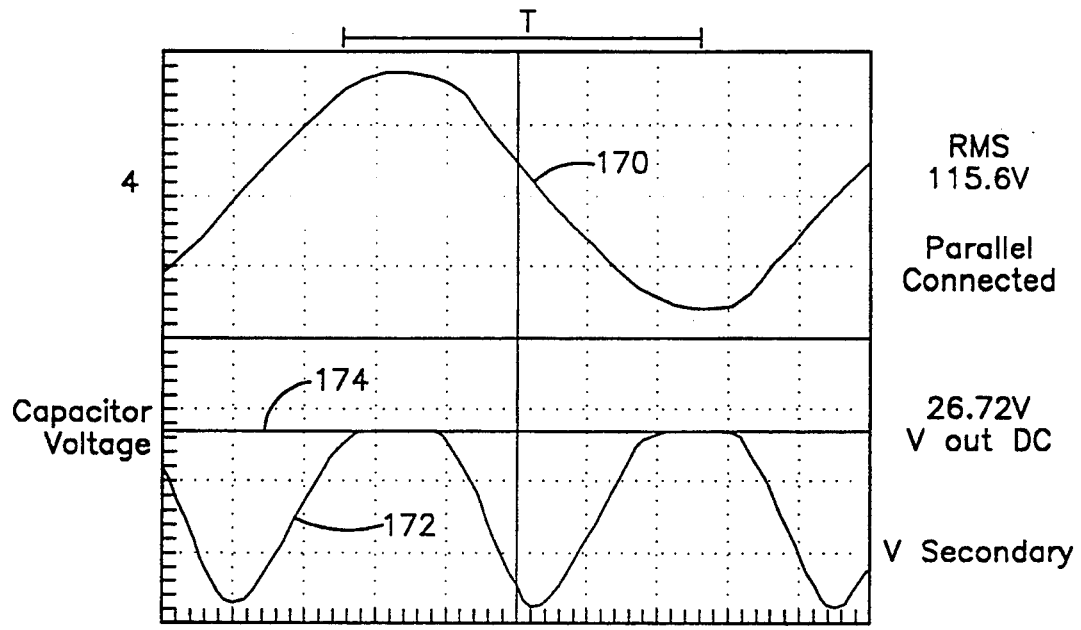
FIGS. 6–11 are voltage waveforms documenting results achieved through practice of the invention with no load current.
Figure 7:
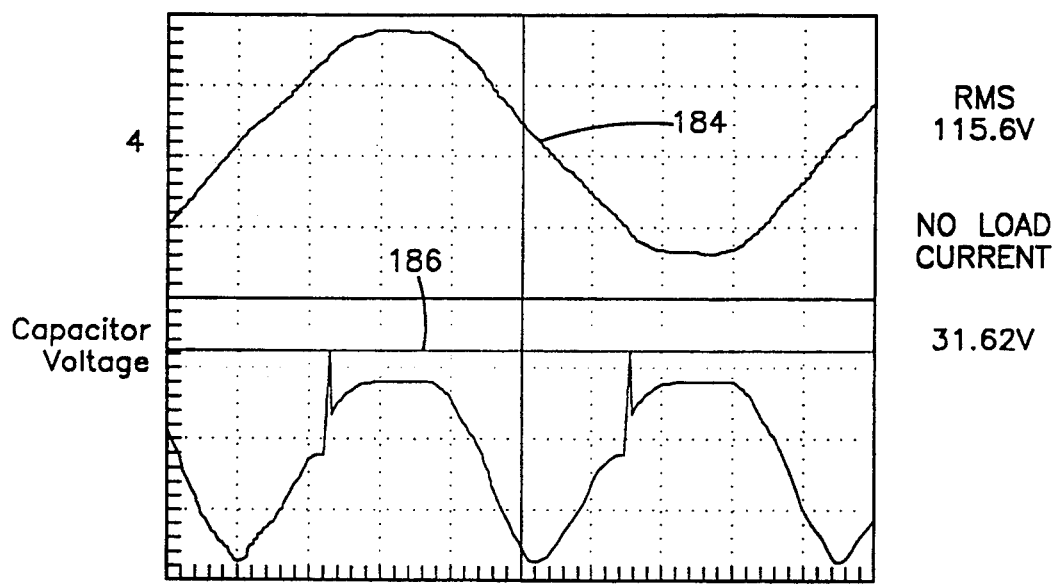
Figure 8:
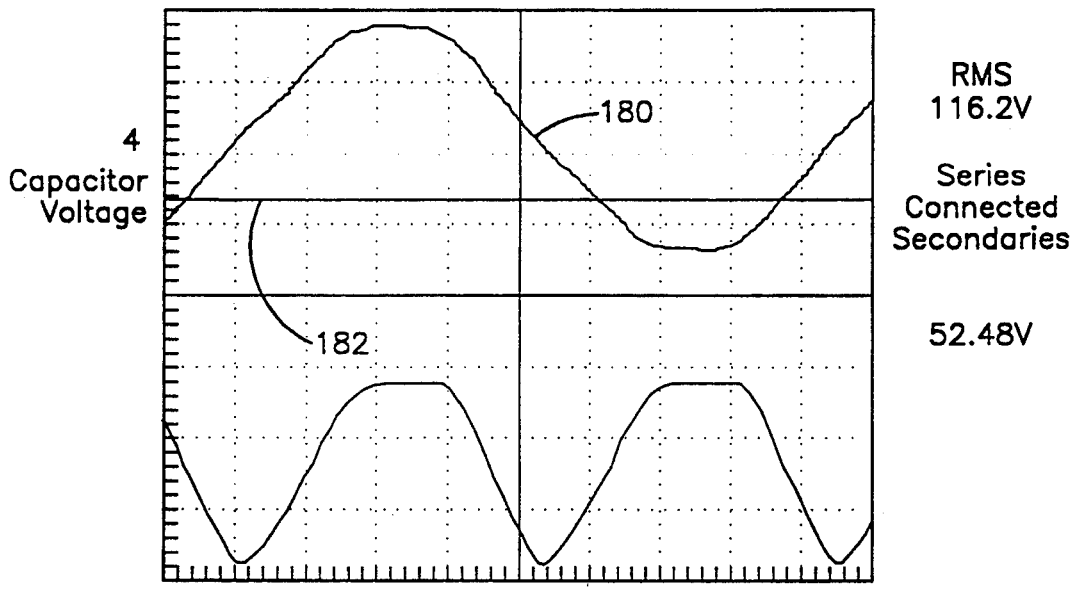
Figure 9:
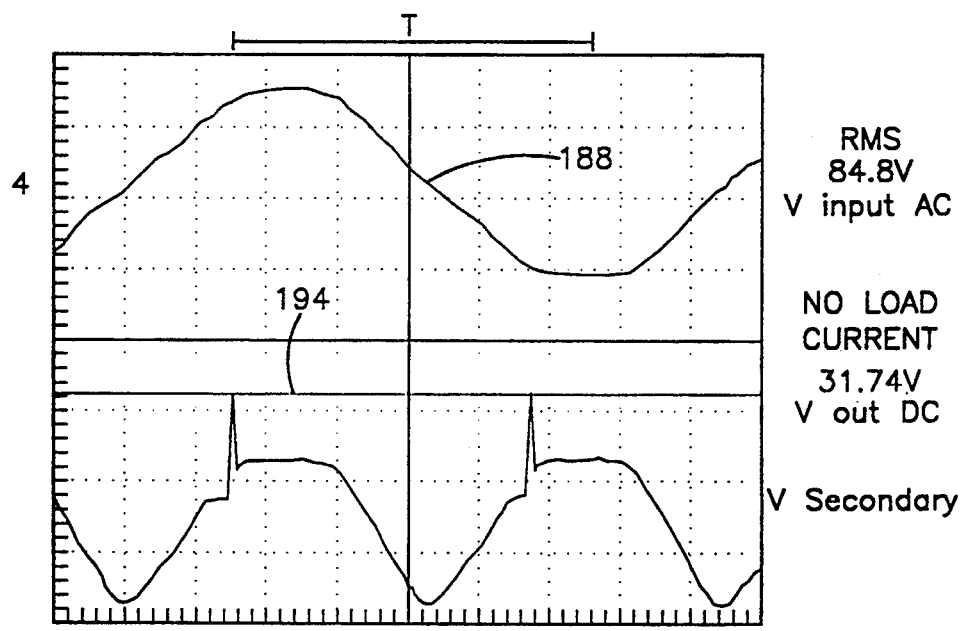
Figure 10:
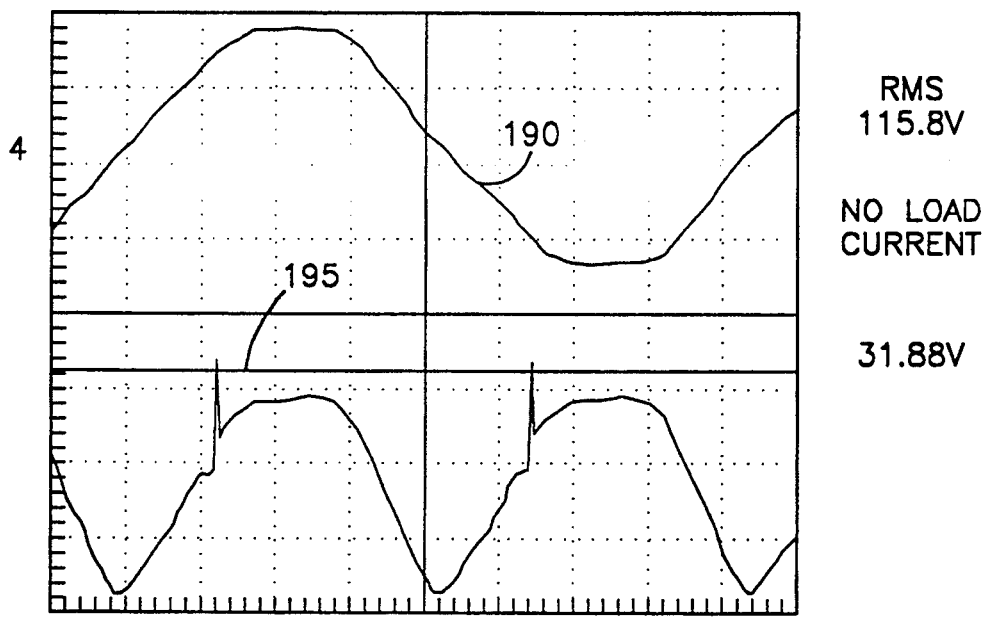
Figure 11:
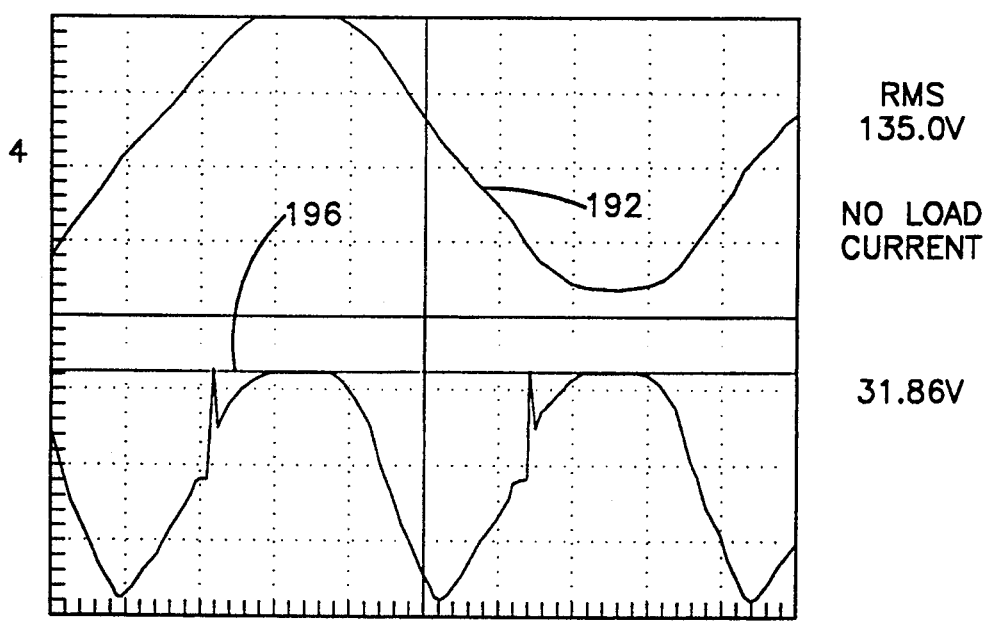

FIGS. 6–11 depict voltage waveforms to help illustrate operation of the power supply 10 with no load coupled across the terminals 12, 14. FIG. 6 illustrates a voltage waveform 170 that is coupled across two parallel primary windings 168 in FIG. 2 and has a measured value of 115.6 volts RMS. The two secondary windings 30, 32 are permanently connected in parallel by removing the transistor 60 and each secondary has an RMS voltage waveform 172 of 17 volts induced across its output. The voltage 174 on the capacitor 110 was measured as 26.72 volts d.c. In FIG. 8, the voltage 180 at the input to the transformer primary was measured as 116.2 volts RMS and with the secondary windings 30, 32 positive outputs 44, 50 permanently connected in series the capacitor voltage 182 increased to 52.48 volts RMS. The effects of switching from a series to parallel connection are shown in FIG. 7. Twice during each 60 hertz period, the transistor 60 is rendered non-conductive. The input voltage 184 to the transformer was measured as 115.6 volts RMS and the voltage 186 on the capacitor 110 was measured as 31.62 volts DC. FIGS. 9, 10 and 11 show operation of the FIG. 2 circuit at input voltages 188, 190, 192 of 84.8, 115.8 and 135 VAC into the primary with the output voltages 194, 195, 196 regulated at 31.74, 31.88, and 31.86 volts DC.

Figure 12:
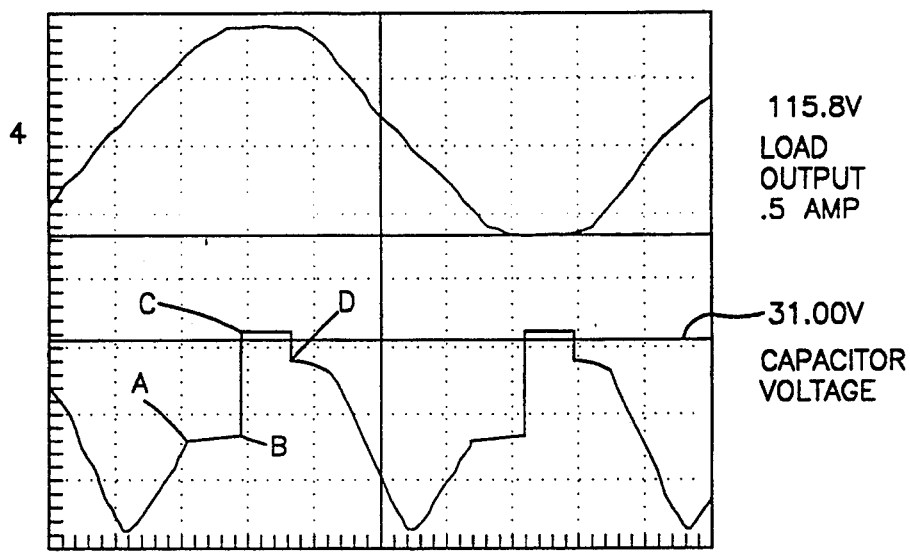
FIG. 12 is a voltage waveform documenting results achieved with a load coupled to the power supply.

Turning to FIG. 12, this figure depicts waveforms at various junctions of the power supply when a load is coupled across the output terminals, 12, 14. The waveforms depicted were obtained when the power supply was producing a one-half ampere current within a load resistor coupled across the power supply output.

As seen in this depiction, an input voltage 197 across the primary was essentially the same as FIG. 6 and was measured at 115.8 volts RMS. A voltage 198 on the capacitors 110a, 110b, 110c was measured at 31 volts DC. A voltage 199 across the secondary 32 is depicted in the bottom portion of FIG. 12. This depiction shows transition regions from the relatively smoothly varying signals shown in the earlier figures.

At a first transition A the secondary voltage rises with a gradual slope as the capacitors are charging. At a transition B, a change from a series to a parallel combination of the two secondaries 30, 32 takes place and the voltage across the secondary 32 rapidly increases to the voltage across the capacitor. Beginning at the transition C and extending to the transition D in FIG. 12 the voltage across the secondary remains constant as energy stored in the transformer is transferred to the storage capacitor. Transition D in the figure indicates the point at which the capacitor stops charging on this half cycle within the alternating current period.

Certain benefits occur through to use of the power supply utilizing a voltage regulator 120. The voltage on the capacitor as illustrated in FIGS. 6–12 remains very stable during the periodic switching of the transistor 60. Since the capacitor voltage is maintained within close tolerances, the voltage regulator 120 can operate over a relatively wide range of alternating current signal voltages without energy loss due to variations of the voltage at an input terminal to the regulator 120. Only a small voltage drop across the regulator from the input to the output is needed and a dramatic improvement in the power output from the regulator achieved without resort to a heat sink.

Figure 13:
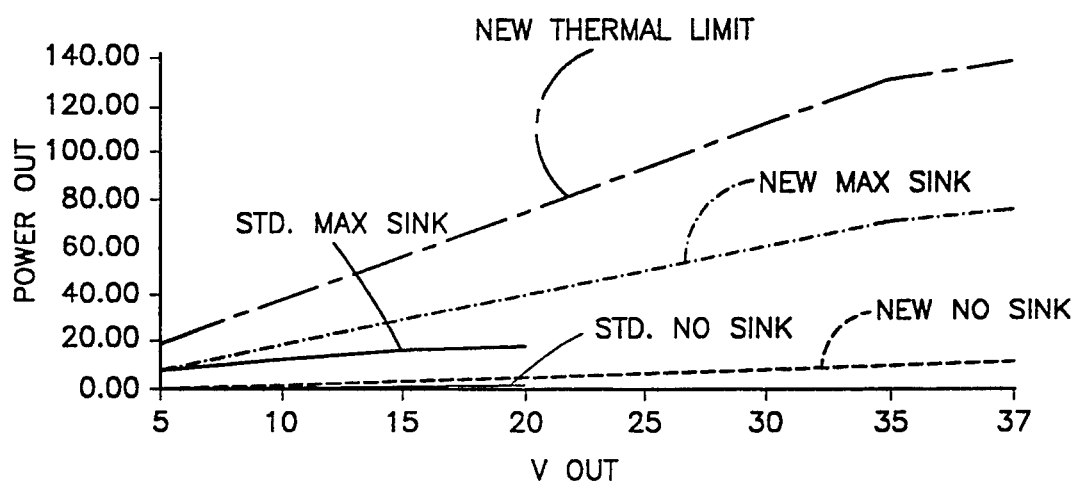
FIG. 13 is a graph showing the power output capabilities of the FIG. 2 circuit.

The improved performance of the regulator 120 is due in part to the fact that the voltage across the regulator is small assuring that excess power applied to the regulator is not dissipated in the form of heat. FIG. 13 is a graph showing maximum power output from a three terminal regulator 120 (in watts) as a function of voltage output from the regulator. Table 1 below tabulates this power output graph:

TABLE 1

| | POWER | | | | |
| | PRIOR ART | | THE INVENTION | | Internal 2 |
| V out | No Sink | Infinite Sink | No Sink | Infinite Sink | A Limit on IC |
| --- | --- | --- | --- | --- | --- |
| 5 | 0.68 | 8.87 | 1.41 | 18.33 | 10.00 |
| 10 | 1.03 | 13.41 | 2.82 | 36.67 | 20.00 |
| 15 | 1.24 | 16.18 | 4.23 | 55.00 | 30.00 |
| 20 | 1.39 | 18.03 | 5.64 | 73.33 | 40.00 |
| 25 | | | 7.05 | 91.67 | 50.00 |
| 30 | | | 8.46 | 110.00 | 60.00 |
| 35 | | | 9.87 | 128.33 | 70.00 |
| 37 | | | 10.43 | 135.67 | 74.00 |

The above table is a calculated result based upon certain assumptions. It is assumed the input voltage varies from 95 to 135 volts which results in a maximum input voltage to the regulator of 40 volts assuming transformer regulation of 20%. As current in the load increases, heat is generated in the regulator and this heat must be dissipated. The power output is limited by the maximum amount of heat dissipated by the regulator which limits the maximum current and the rated maximum input voltage to the regulator.

For an LM317 regulator the maximum input voltage is 40 volts. With 40 volts input and 20 volts output, current without a heat sink is limited to 0.07 amps. With a heat sink capable of dissipating the maximum 11 watts of heat, the device can generate current limited to 0.90 amps. The use of the invention results in greater power limits both with and without a heat sink due to the small voltage drop across the voltage regulator which limits current through the regulator.

So-called low dropout regulators are known which reduce the amount of voltage required across the regulator to maintain a regulated output. These low dropout regulators could operate very effectively with the circuit shown in FIG. 2 since the input voltage to the regulator can be controlled quite accurately and adjusted to result in even higher power output.

Alternate embodiments

Figure 4:
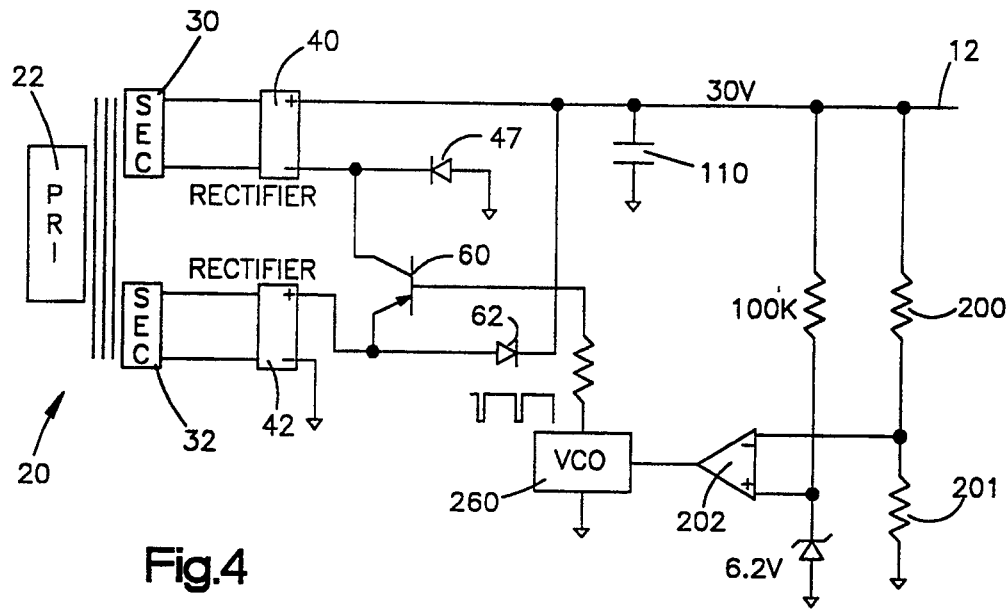
Figure 5:
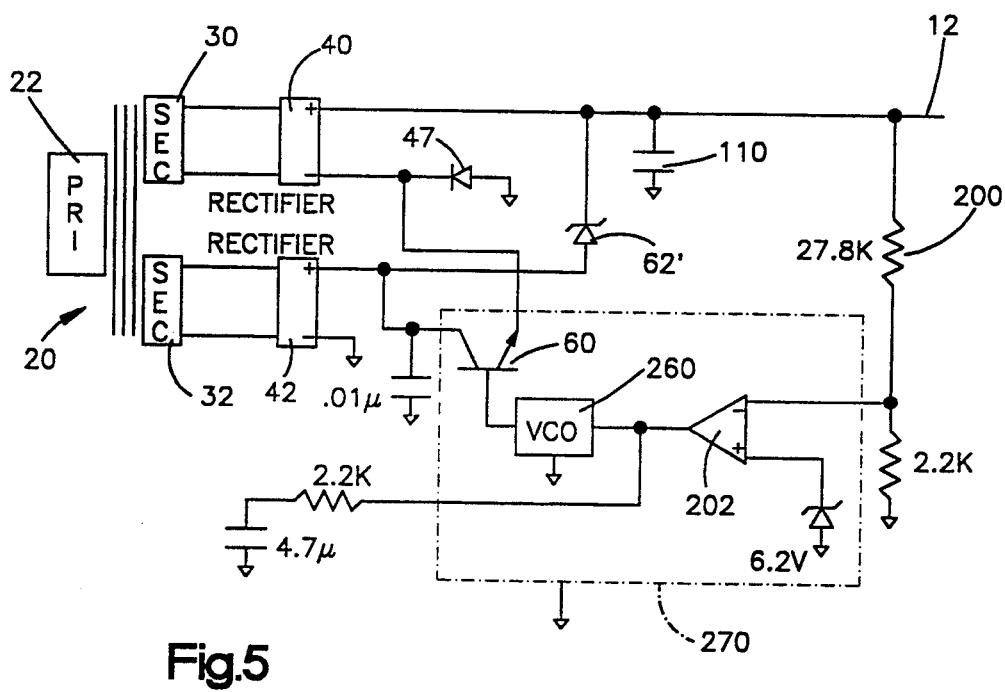

FIGS. 4 and 5 depict alternate embodiments of the invention. In these figures, like reference characters are used to describe components identical to those disclosed in FIGS. 1 and 2. Each of these circuits includes a switch 60 in the form of a switching transistor whose conductive state determines the manner in which output signals from two rectifiers 40, 42 are coupled to a capacitor 110.

Figure 3:
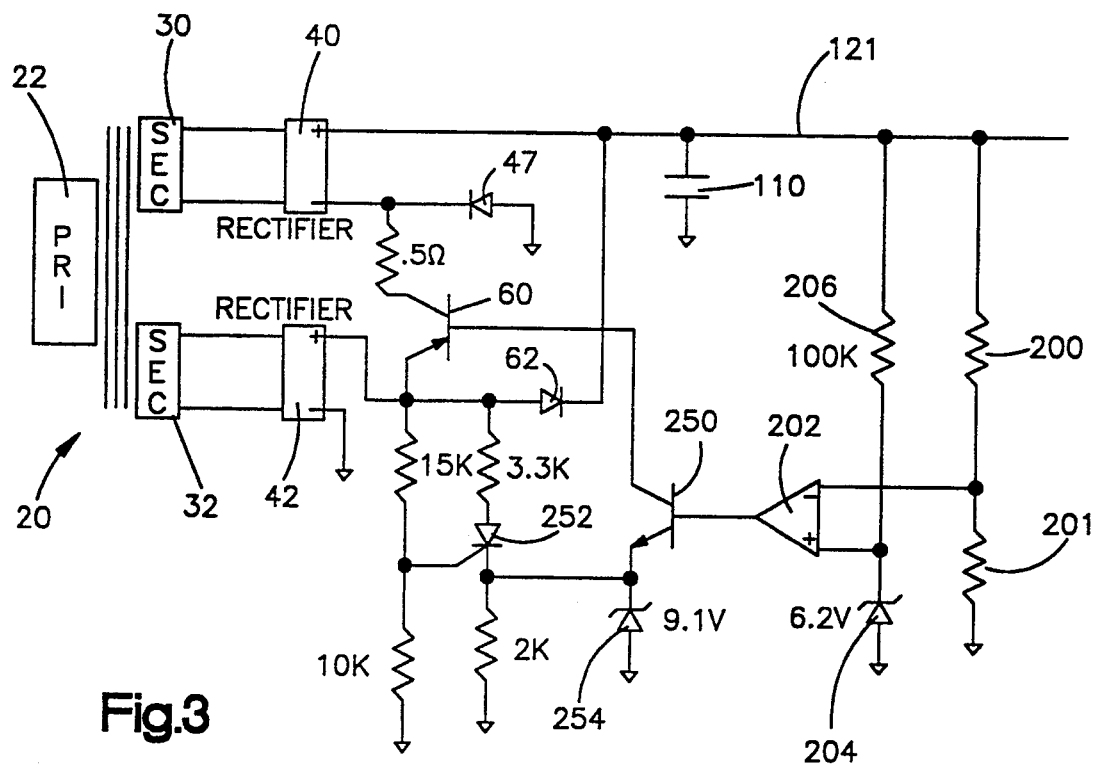
FIGS. 3–5 depict alternate embodiments of power supplies having at least two transformer secondaries whose rectified output is connected in series and then parallel based upon a sensed condition.

FIG. 3 illustrates an embodiment in which the voltage on the capacitor 110 is connected to a voltage divider made up of two resistors 200, 201 coupled to the inverting input (−) of an operational amplifier 202. The amplifier 202 acts as a differential amplifier having a reference input (+) defined by the combination of a zener diode 204 that breaks down at 6.2 volts and a resistor 206 connected to the output capacitor 110.

The amplifier 202 creates an error signal between the 6.2 volt reference voltage from zener diode 204 and the output voltage 121 divided by the resistors 202, 201. The output of the amplifier 202 adjusts the reference voltage for a transistor 250. As the cycle starts with secondary voltage low, transistor 250 provides a base input to a switch 60, causing the switch 60 to conduct.

When the secondary voltage out of bridge rectifier 42 approaches 15 volts, the voltage on the gate of SCR 252 (15 volts divided by R353 and R354) gates on the SCR 252 for the balance of the AC line cycle. When the SCR 252 turns on, its cathode voltage rises to 9 V, limited by a zener diode 254. This turns the transistor 250 off which in turn turns switch 60 off. This action switches the secondaries into a parallel combination. The output voltage on the capacitor 110 is approximately equal to twice the output from the rectifier 42 at the series to parallel switch point, due to symmetry of the both secondaries 40, 42. A minor correction is done by the amplifier feedback. This circuit demonstrates that this new power supply scheme is compatible with standard IC components including switch 60 and even custom power IC's.

FIG. 4 shows a variation where a voltage controlled oscillator 260 continuously causes switch 60 to alternately conduct and not conduct, switching the secondaries from series and parallel with a varying duty cycle. This causes the capacitor 110 to charge slightly slower but over a wider conduction angle of the AC power cycle. This results in a lower peak input current of similar RMS value as the circuit in FIG. 1. The output voltage is detected by differential amplifier 202 which creates an error signal proportional to the difference between the divided voltage at the inverting input with 6.2 volt reference zener diode 204. This error signal adjusts the duty cycle of the voltage controlled oscillator, thereby adjusting the conduction time of switch 60 and regulating the output voltage at the terminal 12.

FIG. 5 shows a version of FIG. 4 implemented using a commercial switching regulator power supply integrated circuit 270 from Maxim. All of the semiconductors except diodes 47, 62' are in the IC. Diode 62' is a 20-volt zener diode in this implementation to provide 10-volt minimum to operate the circuit 270. Other ICs are available without this limitation.

Observe that it is technically possible to incorporate all of the diodes into ICs and additionally use Power Mosfets for diodes to create synchronous rectifiers, with almost no internal resistance (<10 milliohm) thereby further reducing the power loss in the power supply 10.

The present invention has been described with a degree of particularity. It is the intent that the invention include all alterations and modifications from the disclosed embodiments falling within the spirit or scope of the appended claims.

I claim:

1. A power supply comprising:
   a) a transformer having a primary winding inductively coupled to first and second secondary windings to induce time varying voltages across said first and second secondary windings in response to energization of the primary winding by an alternating current input signal having a characteristic frequency and period;
   b) rectifier means coupled to the transformer for rectifying the time varying voltages induced in the first and second secondary windings and providing first and second pulsed power supply signals to a power supply output;
   c) output means for coupling the first and second pulsed power supply signals from the rectifier means to a load;
   d) switching means for coupling the first and second pulsed power supply signals from the rectifier means to the output means, said switching means including switch circuitry for, first connecting the power supply signals in series and then in parallel during each successive period of the alternating current input signal; and
   e) sensing means coupled to the rectifier means for sensing voltage at a control output coupled to the load and actuating the switching means to switch from a series to a parallel connection of the first and second pulsed power supply signals during each successive period of the alternating current input signal.

2. The power supply of claim 1 wherein the output means comprises a capacitor that is charged by the pulsed power supply signals from the rectifier means.

3. The power supply of claim 1 wherein the switching means includes a switching transistor for coupling outputs from the rectifier means in series and in parallel.

4. The power supply of claim 3 where the sensing means comprises a silicon controlled rectifier having a control electrode that causes a change in state of the switching transistor.

5. The power supply of claim 2 wherein the output means comprises a three terminal voltage regulator including an input coupled to the capacitor and an output that provides the power supply output.

6. A method for providing a regulated direct current voltage signal from an alternating current input signal having a frequency and period comprising the steps of:
   a) transforming the alternating current input signal into first and second alternating current power supply signals;
   b) rectifying the first and second alternating current power supply signals to produce first and second pulsed power supply signals;
   c) providing switching circuitry for alternately coupling the first and second pulsed power supply signals in series and then in parallel across a storage device to provide a regulated direct current voltage signal at an output from the storage device;
   d) coupling the storage device output to a load for energizing the load;
   e) sensing a control voltage at a control junction electrically coupled to the load; and
   f) actuating the switching circuitry to switch from a series to a parallel connection of the first and second pulsed power supply signals during each period of the alternating current input signal based on the control voltage.

7. The method of claim 6 additionally comprising the step of using the voltage on the storage device as an input to a three terminal voltage regulator and providing a regulated direct current voltage for energizing the load that is less than the voltage on the storage device.

8. The method of claim 6 wherein the step of actuating the switching circuitry is performed by the step of generating a pulse width modulated signal to open and close a switch interconnecting the first and second pulsed power supply signals and varying the duty cycle of said pulse width modulated signal to adjust a relative proportion of series to parallel coupling of the first and second pulsed power supply signals during each period of the alternative current input signal.

9. A power supply comprising:
   a) input means for receiving an alternating current input signal and providing first and second cyclically varying signals;
   b) rectifier means coupled to the input means for rectifying the first and second cyclically varying signals to provide first and second pulsed power supply signal;
   c) output means having a power supply output for coupling the first and second pulsed power supply signals from the rectifier means to a load;
   d) switch means for connecting the first and second pulsed power supply signals from the rectifier means, first in series and then in parallel during each successive cycle period of the alternating current input signal; and
   e) sensing means for causing a switch during each cycle period from a series to a parallel connection of the first and second pulsed power supply signals as a sensed power supply output varies.

10. The power supply of claim 9 wherein the output means comprises a 3-terminal voltage regulator coupled having one terminal that provides the power supply output.

11. The power supply of claim 9 wherein the input means comprises a transformer having a transformer primary coupled to the alternating current input signal and having first and second transformer secondaries to provide the first and second cyclically varying signals as inputs to the rectifier means.

12. The power supply of claim 9 wherein the output means comprises a storage capacitor coupled to store energy provided by said first and second pulsed power supply signals.

13. The power supply of claim 12 where the sensing means comprises:
   a) a differential amplifier having a reference input and a control input coupled to the storage capacitor; and
   b) control means coupled to an output of the differential amplifier to dictate a state of the switch means.

14. The power supply of claim 13 wherein the control means comprises a voltage-controlled oscillator for providing a pulse width modulated signal to activate the switch means at a duty cycle related to an output signal from the differential amplifier.

15. The power supply of claim 11 where the transformer has first and second primary windings connected in parallel.

16. The power supply of claim 9 wherein the sensing means comprises means coupled to the first and second cyclically varying signals for monitoring said cyclically varying signals and switching from a series-to-parallel connection of the first and second pulsed power supply signals when one or the other of said cyclically varying signals reaches a certain value.

17. The method of claim 16 wherein more than two alternating signals are coupled in series and parallel combination.

18. The method of claim 8 wherein the storage device is a capacitor and the control output is a junction coupled to the capacitor and is used to adjust the pulse width modulated signal duty cycle.

19. The method of claim 6 wherein the control junction is coupled through two diodes to a transformer secondary that provides one of the first and second pulsed signals and the sensing step is performed by biasing a switching transistor into conduction based upon the signal coupled to the control junction through one of said two diodes that is forward biased during each one half cycle of the alternating current input signal.

* * * * *